United States Patent [19]
Ginzburg et al.

[11] 3,942,377
[45] Mar. 9, 1976

[54] ELECTROMAGNETIC FLOWMETER

[76] Inventors: Arkady Savelievich Ginzburg, ulitsa Moskovskaya 266, korpus 2, kv. 47; Genrikh Georgievich Gurevich, ulitsa Palangas 11, kv. 78; Generik Khaimovich Kirshtein, ulitsa Moskovskaya, 218, kv. 61; Igor Porfirievich Kvasnevsky, ulitsa Pavlova 17, kv. 59; Vladimir Ivanovich Yakushonok, ulitsa Auseklya 3, kv. 21, all of Riga; Mikhail Naumovich Levin, ulitsa Boldyreva, 6, kv. 46, Kaliningrad Moskovskoi oblasti, all of U.S.S.R.

[22] Filed: July 27, 1973

[21] Appl. No.: 383,460

[52] U.S. Cl. .......................................... 73/194 EM
[51] Int. Cl.² ............................................ G01F 1/58
[58] Field of Search ............................. 73/194 EM

[56] References Cited
UNITED STATES PATENTS

| | | | |
|---|---|---|---|
| 3,449,951 | 6/1969 | Westersten | 73/194 EM |
| 3,802,262 | 4/1974 | Banks | 73/194 EM |

FOREIGN PATENTS OR APPLICATIONS

| | | | |
|---|---|---|---|
| 1,915,376 | 10/1970 | Germany | 73/194 EM |
| 802,017 | 9/1958 | United Kingdom | 73/194 EM |

*Primary Examiner*—Charles A. Ruehl
*Attorney, Agent, or Firm*—Haseltine, Lake & Waters

[57] ABSTRACT

An electromagnetic flowmeter comprising an alternating current magnetic system embracing a section of a pipeline with electrodes attached thereto for removing potentials proportional to the flow rate of the medium and a metering circuit for converting the signals from the electrodes to an output signal proportional to the flow rate of the medium, characterized, according to the invention, in that the pipeline has additional electrodes attached thereto for removing potentials proportional to the eddy currents in the medium, with the metering circuit being made as a comparison circuit whose one input is connected to the main electrodes and the other to the additional electrodes.

3 Claims, 7 Drawing Figures

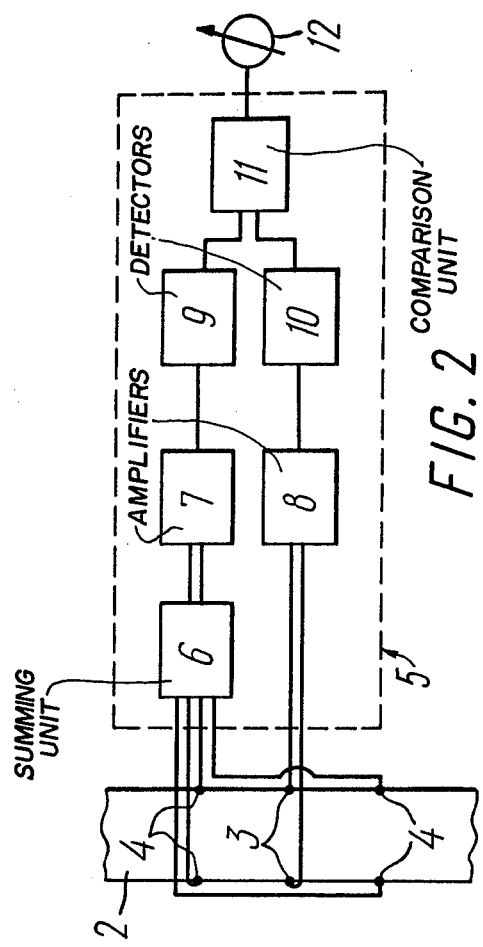
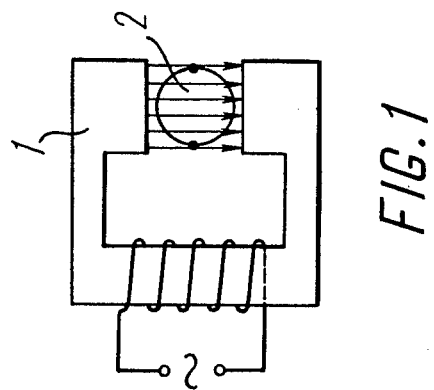

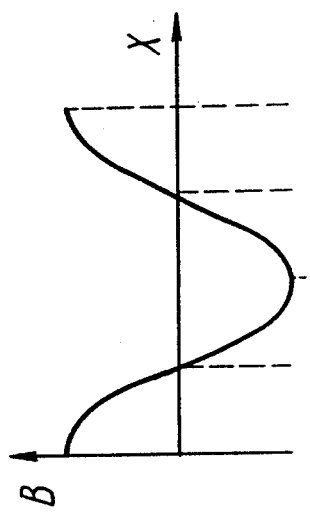
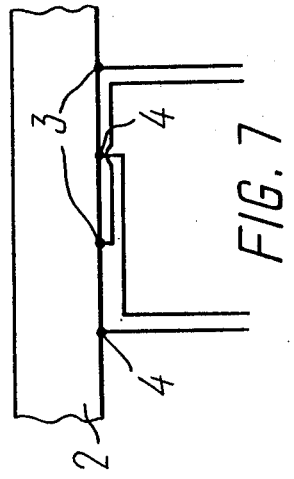
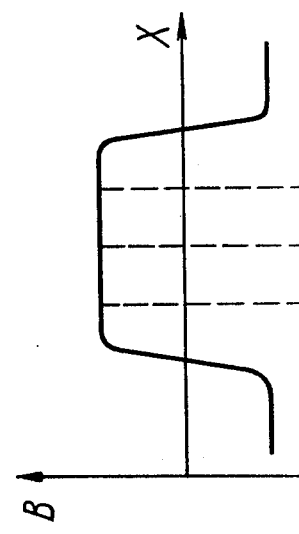
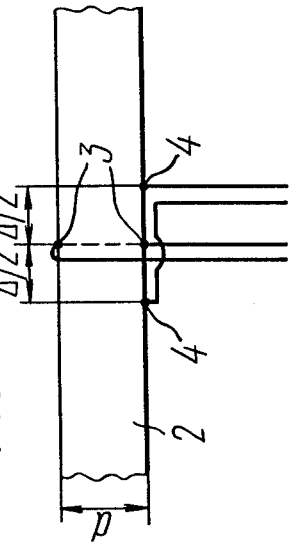

ELECTROMAGNETIC FLOWMETER

The present invention relates to flow measurements in electroconducting media and, more particularly, to an electromagnetic flowmeter, and can be applied to flow measurements in liquids with ionic conductivity and metals in the metallurgical, chemical, nuclear and other industries.

Known in the prior art are electromagnetic non-contact flowmeters for electroconducting media based on the interaction between the variable travelling magnetic field and the fluid. Their readings are independent of the magnetic induction magnitude and conductivity of the medium. No preliminary calibration is required for such flowmeters.

In particular, a non-contact flowmeter is known to have a sinusoidal pulsating magnetic field distributed along the pipeline. The flowmeter comprises inductors for setting up and receiving the magnetic field and an indicator.

A disadvantage of such a flowmeter resides in that the value of the signal therein is proportional to the medium conductivity.

Therefore, such a flowmeter is inadequate for measuring low-conducting media when the magnitude of the signal becomes commensurable with interferences.

Also known in the art is an electromagnetic flowmeter comprising an alternating current magnetic system embracing a section of a pipeline with electrodes attached thereto, whose output signal proportional to the flow rate of the medium is removed with the aid of a metering circuit.

The value of this signal is determined by a number of factors among which is the magnitude and character of distributing the magnetic field over the area where the pipeline with the electrodes is located. The latter is determined both by the type of the magnetic system and by the accuracy of placing it on the pipeline. Therefore, to ensure high-accuracy measurement, it is necessary to calibrate the electromagnetic flowmeter for each particular case, which, in some cases, e.g. when employing the flowmeter for measuring aggressive media, may turn out to be complicated and expensive.

In the process of operation, need also arises for a control calibration which is often difficult to carry out or undesirable, e.g. in the case of a continuous cycle.

An object of the invention is to eliminate special calibration when installing and replacing the magnetic system, as well as control calibrations in the course of operation, thereby improving the reliability and accuracy of measurement.

In attaining this object, the section of the pipeline embraced by an alternating current magnetic system includes, according to the invention, in addition to the main electrodes for removing potentials proportional to the flow rate with the aid of a metering circuit, additional electrodes for removing potentials proportional to the eddy currents in the medium, and the metering circuit is made as a comparison circuit whose one input is connected to the main electrodes, and the other input, to the additional electrodes.

The electrodes are arranged on the pipeline according to the type of magnetic system used.

When using an alternating current magnetic system setting up a magnetic flux, which is not equal to zero, in the closed loop of the pipeline, the additional electrodes are arranged along the generatrices of the pipeline, passing through each main electrode.

When using an alternating current magnetic system setting up a magnetic flux equal to zero along the axis of the pipeline, the additional electrodes are arranged along the generatrix of the pipeline, passing through one of the main electrodes.

When using an alternating current magnetic system setting up a magnetic field distributed sinusoidally along the axis of the pipeline, the additional electrodes are arranged along the generatrix of the pipeline, passing through one of the main electrodes, each additional electrode being arranged with respect to the main electrode at a distance equal to one-fourth of the spatial wave length of the magnetic field.

When using an alternating current magnetic system setting up a magnetic field distributed sinusoidally along the axis of the pipeline, the main and additional electrodes are arranged along one generatrix of the pipeline, the adjacent electrodes being spaced at one-fourth of the spatial wave length of the magnetic field.

An electromagnetic flowmeter embodying the present invention helps to attain the above objects.

To better understand the nature of the invention, a more detailed description of embodiments there of is given below with reference to the accompanying drawings, wherein:

FIG. 1 represents an embodiment of the magnetic system in an electromagnetic flowmeter of the present invention setting up a magnetic flux which is not equal to zero in the closed loop of a pipeline;

FIG. 2 is a block diagram of an electromagnetic flowmeter with the magnetic system of FIG. 1;

FIG. 3 illustrates one of the ways in which the magnetic field is distributed along the axis of a pipeline when the flowmeter employs a magnetic system setting up a magnetic flux equal to zero along the axis of the pipeline;

FIG. 4 shows a section of a pipeline with main and additional electrodes attached thereto, according to the invention, when using a magnetic system with the magnetic field distributed along the axis of the pipeline as shown in FIG. 3;

FIG. 5 illustrates a sinusoidal distribution of the magnetic field along the axis of a pipeline, set up by the alternating current magnetic system;

FIG. 6 shows a section of a pipeline with additional electrodes arranged along the generatrix passing through one of the main electrodes at a distance equal to one-fourth of the spatial wave length of the magnetic field set up along the axis of the pipeline, as shown in FIG. 5;

FIG. 7 shows a section of a pipeline with the main and additional electrodes arranged intermittently along one generatrix, with adjacent electrodes being spaced at one-fourth of the spatial wave length of the magnetic field for the embodiment of the magnetic system setting up a magnetic field distributed sinusoidally along the axis of the pipeline.

The electromagnetic flowmeter comprises an alternating current magnetic system 1 (FIG. 1) embracing a section of a pipeline 2 accommodating main electrodes 3 (FIG. 2) for removing potentials proportional to the flow rate of the medium and additional electrodes 4 for removing potentials proportional to the eddy currents. The main and additional electrodes 3 and 4 are connected to the inputs of a metering circuit 5. The metering circuit represents a comparison circuit and comprises a summing unit 6 whose inputs are connected to two or more pairs of the additional electrodes 4, amplifiers 7 and 8 whose inputs are connected to the output of the summing unit 6 and the main electrodes 3, respectively, detectors 9 and 10 whose inputs are connected to the outputs of the amplifiers 7 and 8, a comparison unit 11 whose inputs are connected to the detectors 9 and 10 and whose output is connected to an indicator instrument 12. The summing unit 6 is made, e.g. as an operational amplifier with a plurality of inputs, while the comparison unit 11 may be made as a differential D.C. amplifier. If only one pair of additional electrodes is attached to the pipeline, the unit 6 is eliminated from the metering circuit 5 and the additional electrodes 4 are directly connected to the input of the amplifier 7.

When the alternating current magnetic system 1 is energized, currents of two types appear in the pipeline 2. These are, firstly, eddy currents due to variations of the magnetic field in time, and, secondly, currents proportional to the flow rate of the medium. Accordingly, the distribution of the electrical potential associated both with the eddy currents and with the currents proportional to the flow occurs over the surface of the pipeline. A signal proportional to the flow rate taken is from the main electrodes 3, and a signal proportional to the eddy currents is taken from the additional electrodes 4. The electrical potentials of these signals are shifted in phase by 90°, with the phase of the signal proportional to the flow coinciding with the induction phase. Owing to the phase relationships mentioned above, these potentials can be separated while taking measurements. The prior-art electromagnetic flowmeter employs the measurement of a potential proportional to the flow.

In addition to the main electrodes 3 for removing the signal proportional to the flow rate, use is also made of the additional electrodes 4 to remove the signal proportional to the eddy currents thereof.

The signals from the main and additional electrodes equally depend on the magnitude of the magnetic field induction. Besides, the difference of potentials being removed from the additional electrodes 4 arranged along the pipeline 2 and the difference of potentials being removed from the main electrodes 3 equally depend on the distribution of the magnetic field in space.

The signal from the main electrodes 3 is amplified by the amplifier 8 and passes on to the phase-sensitive detector 10 producing a signal proportional to the flow rate.

The signal from the additional electrode 4 is summed up in the unit 6 if the number of the additional electrodes exceeds two to be subsequently amplified by the amplifier 7 and detected by the phase-sensitive detector 9 producing a signal proportional to the eddy currents.

The output voltages from the units 9 and 10 are compared in the comparison unit 11 whose output voltage is measured by the instrument 12.

The transformation coefficients of the signals from the main and additional electrodes being equal, the output signals of the detectors 9 and 10 are equal when the flow rate is proportional to the frequency of the magnetic field, the distance between the additional electrodes and the diameter of the pipeline. It is precisely this that makes it possible to calibrate the flowmeter in the course of operation.

Measurements can be taken by various methods. It is possible, for example, to vary the frequency $\omega$ of feeding the magnetic system until the instrument 12 reads zero. In this case, the rate of flow of the medium is found from the formula:

$$V = (\omega \Delta / 2) \tag{1}$$

where $\Delta$ is the distance between the additional electrodes.

It is also possible to measure the voltage difference across the output of the comparison unit 11 at a fixed frequency of the magnetic field. Since it is possible to ensure a 100 per cent deflection of the pointer of the instrument 12 at V = 0, taking into account the linear dependence of the readings on the rate of flow and the fact that the instrument will read zero at rate of flow determined by the relation (I), the flow rate can be measured by directly reading the instrument 12.

In the flowmeter employing an alternating current magnetic system setting up a magnetic flux which is not equal to zero in the closed loop of the pipeline, the additional electrodes 4 should be arranged along the generatrices of the pipeline 2 passing through each one of the main electrodes 3 (FIGS. 1 and 2). This is explained by the fact that under the effect of the magnetic flux which is not equal to zero, currents circulate through the closed loop of the pipeline 2 embraced by the magnetic system under consideration inducing electromotive forces in the electrodes 4 causing errors in measurements. To eliminate the effect of these currents, the signals from both pairs of the additional electrodes 4 are fed to the summing unit 6 wherein useful signals proportional to the eddy currents are summed up, and signals proportional to the currents circulating through the loop due to the magnetic flux which is not equal to zero are subtracted. The signal from the summing unit 6 is fed to the amplifier 7 and subsequent operating conditions are similar to those already described.

For the case when an alternating current magnetic system is used wherein the magnetic flux equal to zero is set up along the axis of the pipeline 2, only two additional electrodes 4 (FIGS. 3, 4) will be sufficient.

The device operates in the same manner as the one described above.

The magnetic system setting up a magnetic flux equal to zero along the axis of the pipeline can be provided, for example, by a linear inductor.

With the sinusoidal distribution of the magnetic field along the axis of the pipeline 2 (FIG. 5), which can be accomplished by the linear inductor with a preset distribution of the linear current load, it is expedient that the additional electrodes 4 be arranged at a distance equal to one-fourth length of the magnetic field wave $\lambda$ along the generatrix passing through one of the main electrodes 3 (FIG. 6).

In this case, the device operates in a manner similar to that described above, with the only distinction being that instead of relation (I) use should be made of the relation:

$$V = (\omega \lambda / 2\pi) \tag{2}$$

With a sinusoidal magnetic field, the main and additional electrodes 3 and 4 can be spaced intermittently at one-fourth of the magnetic field wave length (FIG. 7). The operation of the device in this case is similar to that described above.

Each of the proposed embodiments of the electromagnetic flowmeter has definite advantages. For example, the embodiment of FIG. 2 using a magnetic system with a magnetic flux which is not equal to zero is preferable as for as the simplicity of the magnetic system design is concerned. The well-known C-shaped, O-shaped, saddle-shaped and other systems can be employed as the magnetic system in this embodiment. Such systems show promise in facilitating thermal insulation of large-diameter pipelines and high-temperature installations. However, the structural design of a pipeline with the electrodes and metering circuit of this embodiment is more complex.

The embodiment of the flowmeter using a magnetic system with a sinusoidally-distributed magnetic field is simpler in that it is easier to adapt a pipeline to electrodes arranged according to this system, it is also possible in this embodiment to arrange the electrodes on one side of the pipeline (FIG. 5) but this complicates the design of the magnetic system.

All the embodiments of the proposed electromagnetic flowmeter make it possible to conduct flow measurements (rate of flow) of a medium irrespective of the magnitude of the magnetic field induction and final effects, thereby enabling their characteristics to be rather accurately calculated without calibrating such flowmeters in advance or performing periodic calibrations in the course of operation.

What is claimed is:

1. An electromagnetic flowmeter for measuring the flow rate of a fluid medium including an alternating current magnetic flux generating system positioned to apply said magnetic flux across a section of a pipeline; main electrodes mounted on said pipeline section at diametrically opposed locations thereof adapted to sense potentials proportional to the flow rate of the medium in the pipeline; at least two pairs of additional electrodes mounted on the same pipeline section on generatrixes of said section of the pipeline which extend through each of said main electrodes and adapted to sense potentials proportional to eddy currents produced in the medium due to magnetic field changes with time; and a measuring system including an adder unit having a first input thereof connected to a first pair of said additional electrodes positoned on a first of said generatrixes extending through one of said main electrodes and a second input thereof connected to a second pair of additional electrodes positioned on a second of said generatrixes extending through the other of said main electrodes; a first amplifier having the input thereof connected to said main electrodes; a first phase-sensitive detector adapted to discriminate a signal proportional to the flow rate of the medium having the input therof connected to the output of said first amplifier; a second amplifier having the input thereof connected to the output of said adder unit; a second phase-sensitive detector adapted to discriminate a signal proportional to eddy currents having the input thereof connected to the output of said second amplifier; and a comparator unit connected to the outputs of said first and second phase-sensitive detectors, said comparator unit being adapted to compare the signals from said main and additional electrodes and provide an indication of the flow rate of said medium.

2. An electromagnetic flowmeter according to claim 1, wherein said additional electrodes are positioned with respect to said main electrodes at a distance equal to one-fourth wave length of the magnetic flux generating system.

3. An electromagnetic flowmeter according to claim 2, wherein the magnetic field is sinusoidally distributed along the axis of said pipeline.

* * * * *